(12) United States Patent
Krupenkin et al.

(10) Patent No.: US 11,394,274 B2
(45) Date of Patent: Jul. 19, 2022

(54) MECHANICAL ENERGY HARVESTING UTILIZING LIQUID ROTOR HOMOPOLAR GENERATOR

(71) Applicants: Thomas Nikita Krupenkin, Madison, WI (US); Joseph Ashley Taylor, Madison, WI (US)

(72) Inventors: Thomas Nikita Krupenkin, Madison, WI (US); Joseph Ashley Taylor, Madison, WI (US)

(*) Notice: Subject to any disclaimer, the term of this patent is extended or adjusted under 35 U.S.C. 154(b) by 1076 days.

(21) Appl. No.: 15/730,620

(22) Filed: Oct. 11, 2017

(65) Prior Publication Data

US 2018/0123429 A1 May 3, 2018

Related U.S. Application Data

(60) Provisional application No. 62/407,455, filed on Oct. 12, 2016, provisional application No. 62/407,464, filed on Oct. 12, 2016.

(51) Int. Cl.

| | |
|---|---|
| *H02K 9/18* | (2006.01) |
| *H02K 44/08* | (2006.01) |
| *H02K 44/10* | (2006.01) |
| *H02K 44/12* | (2006.01) |
| *H02K 44/16* | (2006.01) |
| *H02K 11/00* | (2016.01) |

(Continued)

(52) U.S. Cl.
CPC ............... *H02K 9/18* (2013.01); *H02K 1/22* (2013.01); *H02K 11/0094* (2013.01); *H02K 44/085* (2013.01); *H02K 44/10* (2013.01); *H02K 44/12* (2013.01); *H02K 44/16* (2013.01); *H02K 44/18* (2013.01)

(58) Field of Classification Search
CPC ........ H02K 9/10; H02K 1/22; H02K 11/0094; H02K 44/085; H02K 44/10; H02K 44/12; H02K 44/16; H02K 44/18; H02K 1/20; H02K 44/85; H02K 9/18; A61F 2002/708; A61F 2002/5004; H02J 7/14; A51F 2002/5004; F05B 2210/10; F05B 2220/706; F05B 2260/408; F03B 13/00
See application file for complete search history.

(56) References Cited

U.S. PATENT DOCUMENTS

| | | |
|---|---|---|
| 3,143,673 A | 8/1964 | Donaldson |
| 3,496,871 A | 2/1970 | Stengel |

(Continued)

FOREIGN PATENT DOCUMENTS

| | | |
|---|---|---|
| FR | 3025950 | 3/2016 |
| KR | 10-2014-0070904 | 6/2014 |

*Primary Examiner* — Bryan R Perez
(74) *Attorney, Agent, or Firm* — Wendy W. Koba

(57) ABSTRACT

An apparatus providing mechanical-to-electrical energy conversion generates electrical current by moving a conductive fluid in the presence of magnetic field. The motion of the fluid is induced by a mechanical energy source and the generated electrical current is directed to a useful load. The proposed apparatus utilizes a conductive fluid as a "liquid rotor" has substantially different radial velocity distribution than the conventional, prior art solid rotor. The apparatus includes an inverter, controlled by the flow of the conductive fluid, to generate a train of pulses as an output, where the pulses are used by an associated transformer to provide an AC output voltage.

6 Claims, 14 Drawing Sheets

(51) Int. Cl.
*H02K 1/22* (2006.01)
*H02K 44/18* (2006.01)

(56) References Cited

U.S. PATENT DOCUMENTS

| | | | | |
|---|---|---|---|---|
| 4,906,877 | A * | 3/1990 | Ciaio | H02K 44/04 |
| | | | | 310/11 |
| 5,770,909 | A * | 6/1998 | Rosen | H02K 11/0094 |
| | | | | 310/113 |
| 2011/0204653 | A1 | 8/2011 | Liu et al. | |
| 2012/0038308 | A1* | 2/2012 | Zadeh | H01F 38/18 |
| | | | | 318/716 |
| 2012/0146534 | A1* | 6/2012 | Yu | H05B 41/2825 |
| | | | | 315/224 |
| 2013/0270839 | A1 | 10/2013 | Krupenkin et al. | |
| 2014/0068973 | A1 | 3/2014 | Krupenkin et al. | |
| 2015/0222166 | A1 | 8/2015 | Kim et al. | |
| 2016/0020017 | A1 | 1/2016 | Blomqvist et al. | |
| 2016/0025111 | A1* | 1/2016 | Kenway | H02J 1/00 |
| | | | | 60/327 |
| 2018/0095133 | A1* | 4/2018 | Kealy | G05B 23/0283 |

* cited by examiner

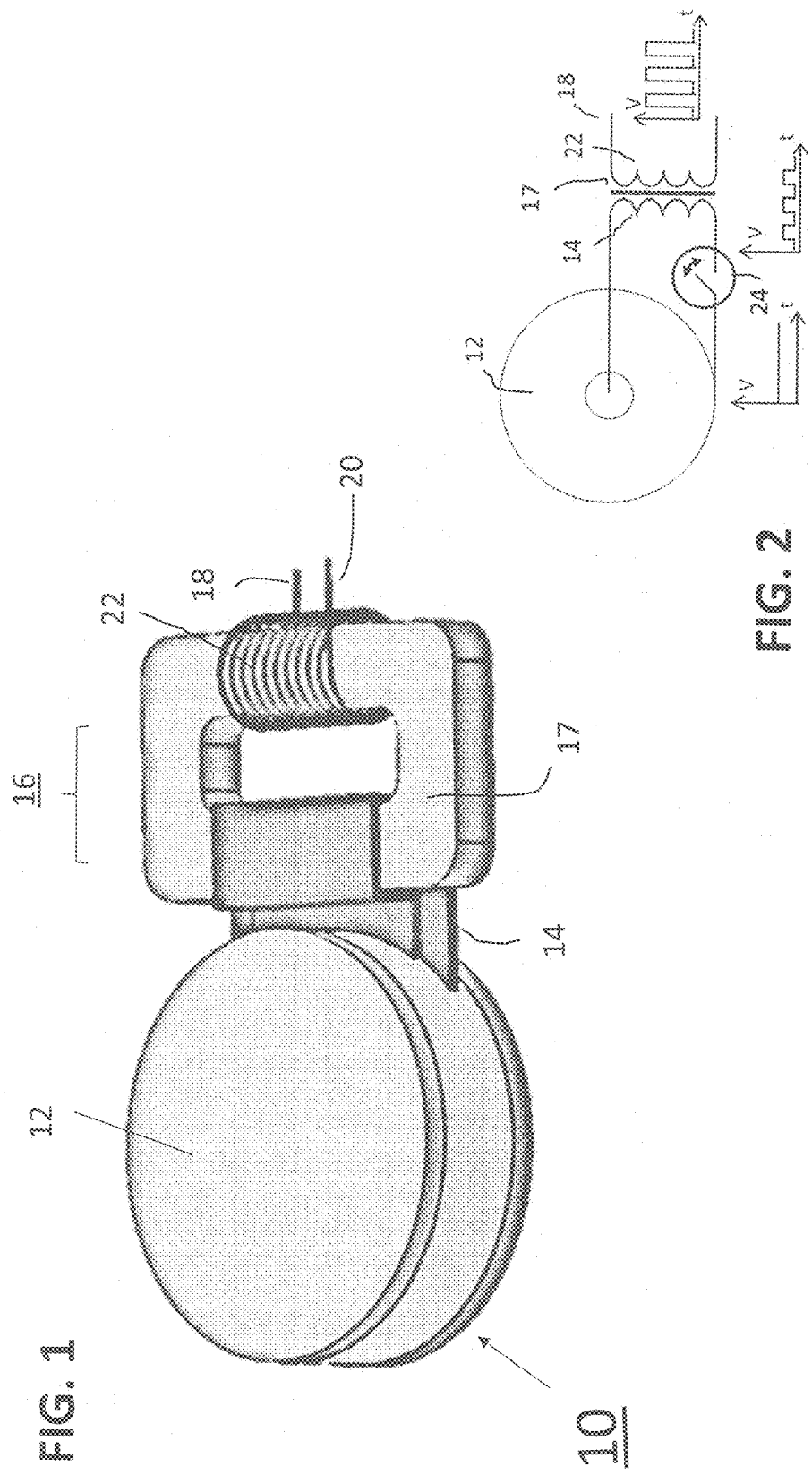

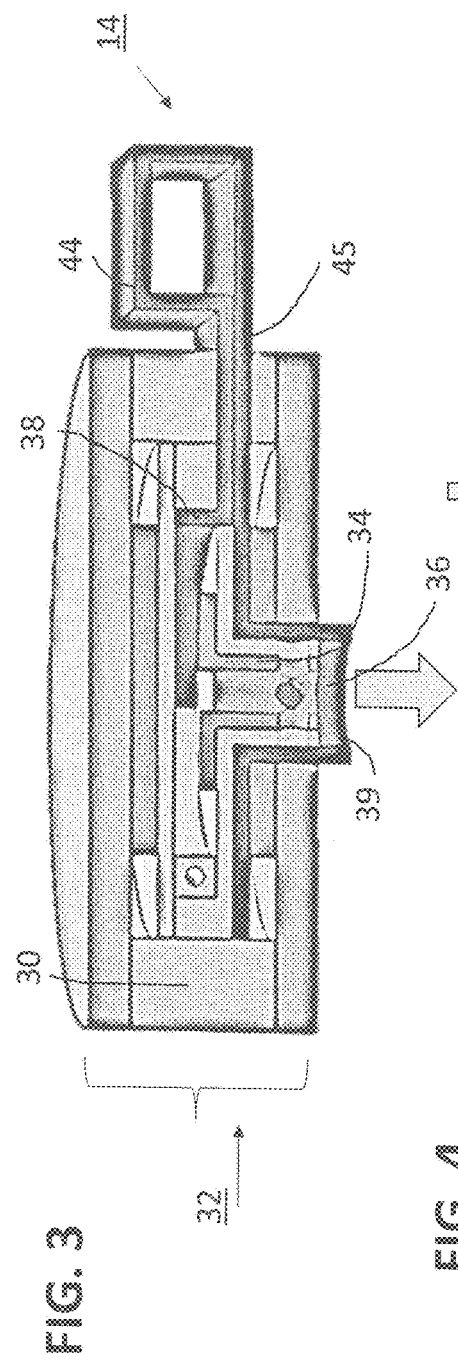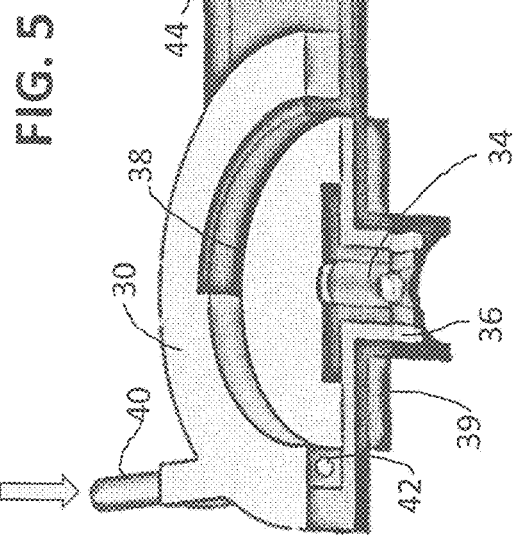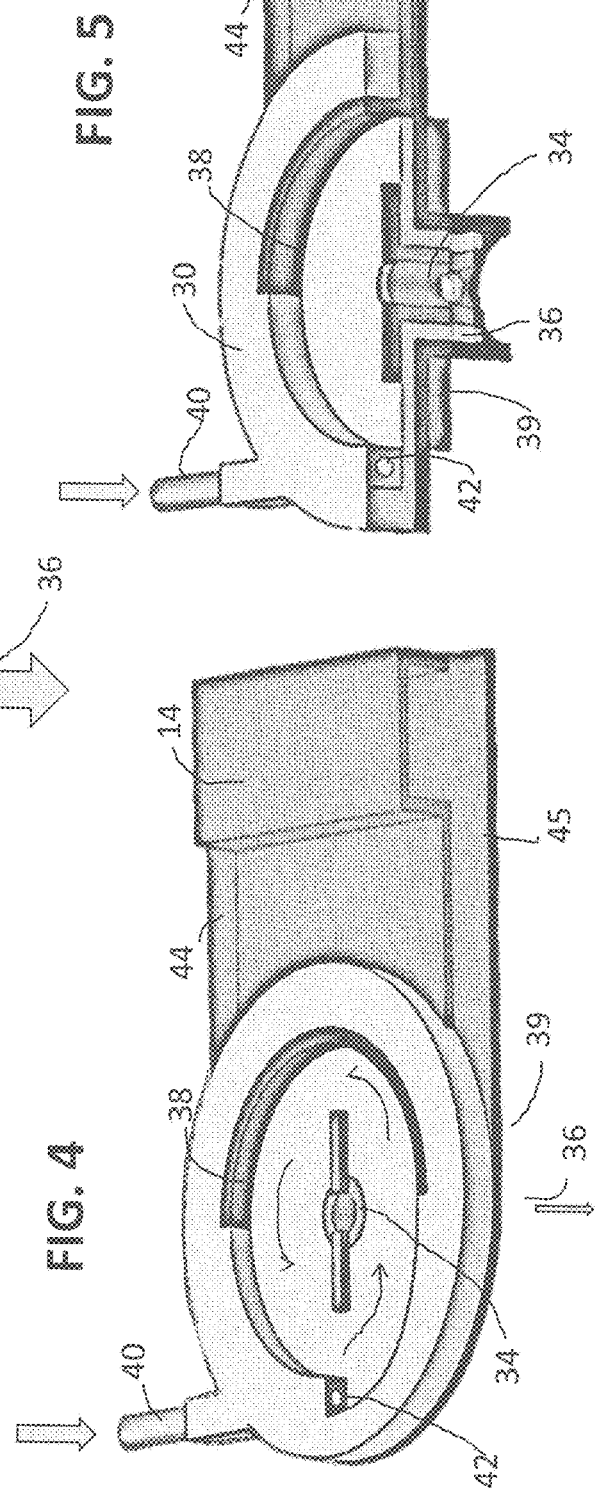

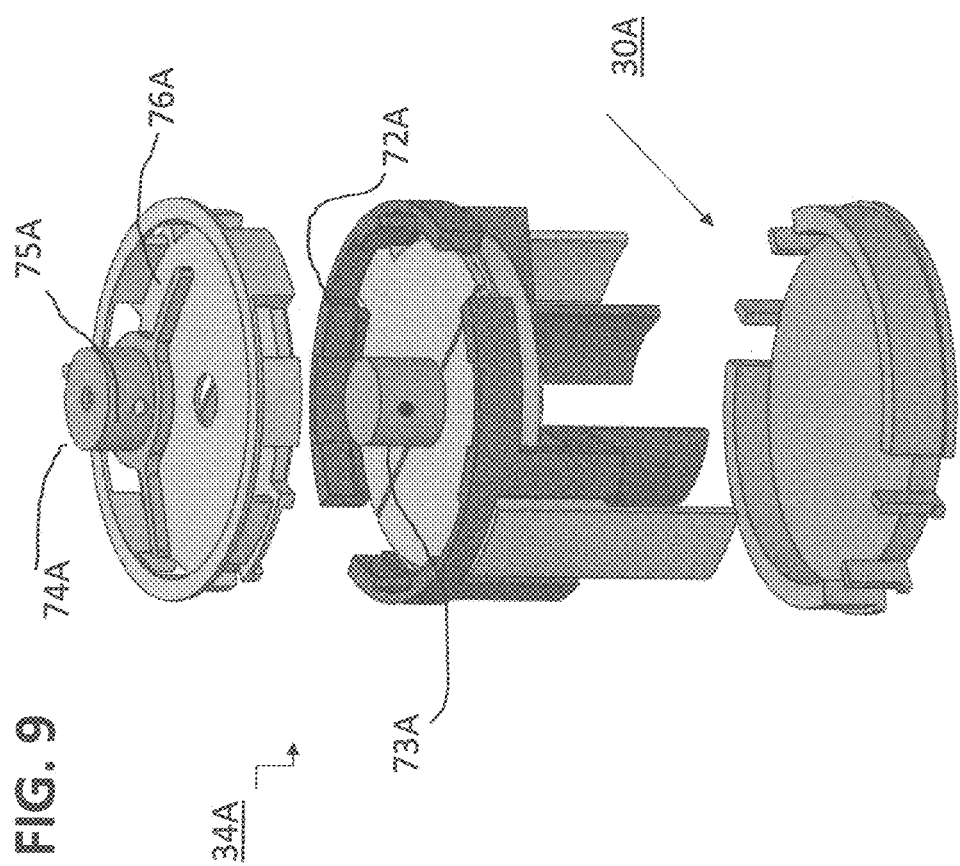
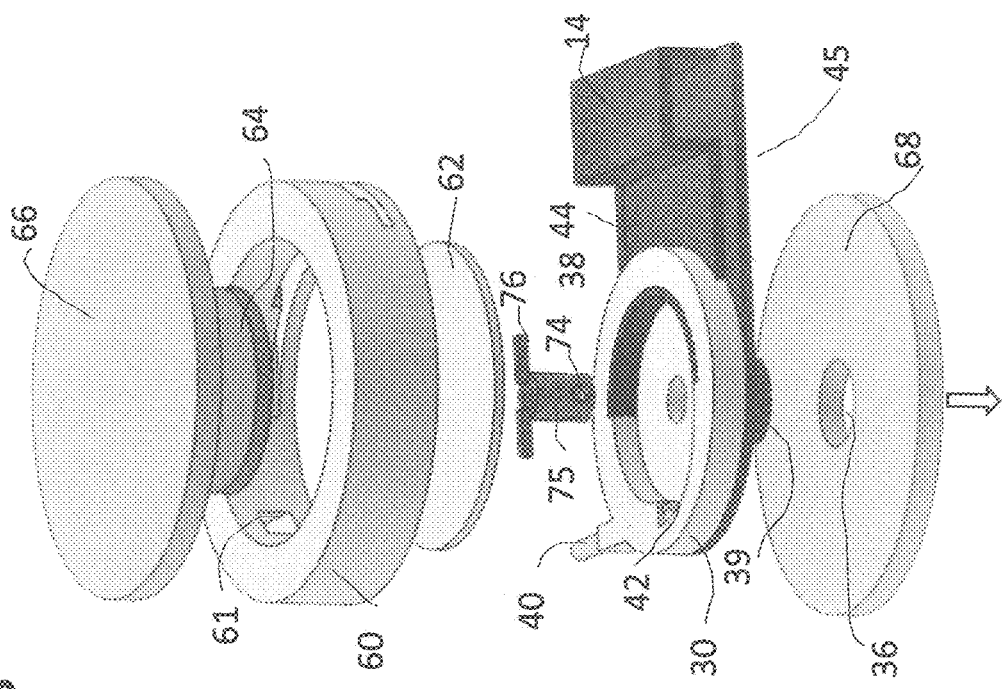

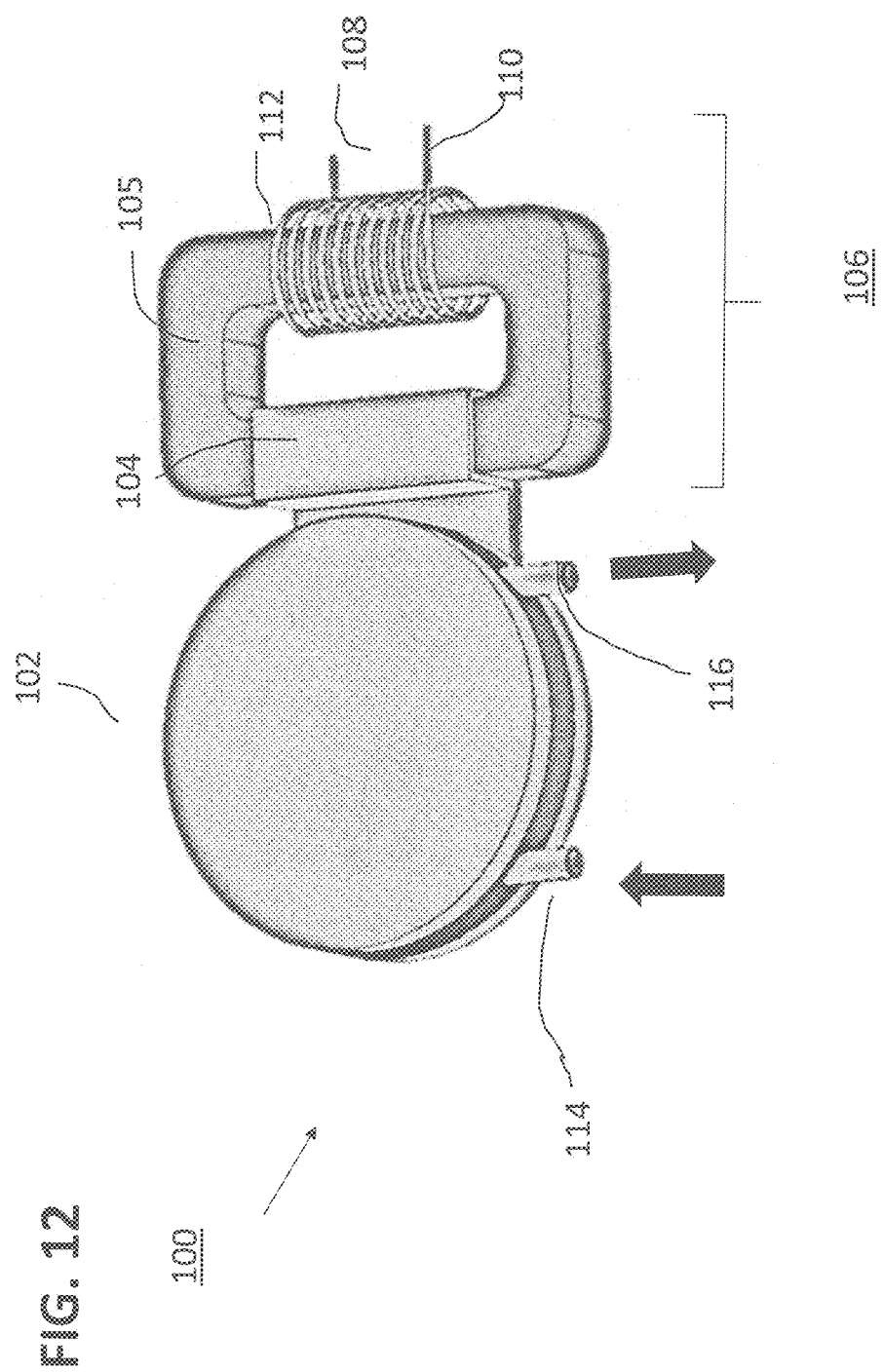

MECHANICAL ENERGY HARVESTING UTILIZING LIQUID ROTOR HOMOPOLAR GENERATOR

CROSS-REFERENCE TO RELATED APPLICATIONS

This application claims the benefit of U.S. Provisional Application Ser. No. 62/407,455 and U.S. Provisional Application Ser. No. 62/407,464, both filed Oct. 12, 2016 and herein incorporated by reference.

TECHNICAL FIELD

The present invention relates to the conversion of unused mechanical energy into useful electrical energy (i.e., "harvesting" of mechanical energy) and, more particularly to a system and method based upon a homopolar generator utilizing a liquid or semi-liquid rotor that is moved by an applied mechanical force.

BACKGROUND OF THE INVENTION

Currently the majority of autonomous and mobile electronic systems are powered by electrochemical batteries, Although the battery quality has substantially improved over the last two decades, their energy density has not greatly increased. At the present time, factors such as cost, weight, limited service time, and waste disposable problems (intrinsic to the batteries), are impeding the advance of many areas of electronics. The problem is especially acute in the portable electronics space, where rapidly growing performance and sophistication of mobile electronic devices lead to ever-increasing power demands which electrochemical batteries are unable to meet.

One of the technologies that holds great promise to substantially alleviate current reliance on the electrochemical batteries is high-power energy harvesting. The concept of energy harvesting works towards developing self-powered devices that do not require replaceable power supplies. In cases where high mobility and high-power output is required, harvesters that convert mechanical energy into electrical energy are particularly promising as they can tap into a variety of high-power-density energy sources including mechanical motions of various kinds, such as vibrations, human and machine motion, etc.

High-power harvesting of mechanical energy from environmental mechanical motion is a long-recognized concept which has not been commercialized in the past due to the lack of a viable energy harvesting technology, Existing methods of mechanical-to-electrical energy conversion such as electromagnetic, piezoelectric, or electrostatic do not allow effective direct coupling to the majority of high-power environmental mechanical energy sources. Once such existing prior art system is described in U.S. Pat. No. 3,143,673, entitled "Homopolar Generator" and issued to C. Du P, Donaldson on Aug. 4, 1964. In this arrangement, a conductive fluid is forced to flow through an established magnetic field, but relies on a periodic liquid flow to provide a DC output current.

Bulky and expensive mechanical or hydraulic transducers are required to convert a broad range of aperiodic forces and displacements typically encountered in nature into the form accessible for conversion using those methods. Thus, any method of mechanical-to-electrical energy conversion that can provide effective coupling to a broad range of forces and displacements would be highly beneficial as it would allow to extend the energy harvesting to a wider range of environments.

SUMMARY OF THE INVENTION

The needs remaining in the art are addressed by the present invention, which relates to the conversion of unused mechanical energy into useful electrical energy "harvesting" of mechanical energy) and, more particularly to a system and method based upon a homopolar generator utilizing a liquid or semi-liquid rotor that is moved by an applied mechanical force.

In particular, the present invention discloses a new method of mechanical-to-electrical energy conversion that generates electrical current by moving a conductive fluid in the presence of magnetic field. The motion of the fluid is induced by the mechanical energy source and the generated electrical current is directed to the useful load, thus allowing conversion of mechanical energy into electrical energy. The proposed device has some similarities to magneto-hydrodynamic (MHD) generators and to traditional homopolar generators (HG) but does not belong to any of those two groups.

Similar to MHD devices, electrical current in the inventive apparatus is generated by the motion of conductive fluid in the presence of magnetic field. However, unlike traditional MHD devices, the flow of the fluid in the inventive system is not along a straight line but takes a form of a swirling circular pattern, or cyclone. This cyclonic motion of the conductive fluid results in rotating cylindrical body of conductive fluid, which superficially resembles the rotor of a traditional HG device. However, unlike traditional HG devices (where the rotor is solid), the proposed device has a liquid (or semi-liquid) rotating member (hereinafter defined as a "liquid rotor"). The liquid rotor has substantially different radial velocity distribution than the conventional, prior art solid rotor. This leads to the very different and in many respects superior performance characteristics of the proposed device as compared to the traditional HG devices.

In addition, the apparatus of the present invention provides an alternating current (AC) output. Traditional MHD and HG devices were limited in only being able to provide a direct current (DC) output as the harvested energy. The provision of an AC output allows the inventive apparatus to be easily adapted to provide the device output voltage at a desired level. This greatly extends the applicability of the proposed apparatus as it allows the apparatus to harvest useful energy from a wide variety of sources, including those exhibiting very low flow velocities as the supply flow. In the past, this low flow velocity precluded DC-based energy harvesters from being able to operate since the output voltage of traditional MHD or HG generators cannot be adjusted if it falls below a minimum value.

A particular application of the energy harvesting device of the present invention is in the field of prosthetic devices, where various newer designs have incorporated microprocessor-based elements to control the "feel" of the device under different conditions (e.g., differences in a prosthetic ankle reaction for walking vs. standing). The incorporation of the inventive energy harvesting device eliminates the need fora battery source and/or constant recharging. The prosthetic application of the inventive energy harvesting apparatus is relevant in the provision of any "smart" prosthetic joint, including but not limited to ankle, knee, wrist, elbow, etc. The energy harvesting device of the present invention is equally applicable for use with "smart" orthesis devices (i.e., exterior braces and other supports used to assist/support a person recovering from injuries or having a specific orthopaedic condition).

An exemplary embodiment of the present invention takes the form of a mechanical energy harvesting apparatus comprising an electrical generator for converting mechanical energy into a direct current output, an inverter coupled to the electrical generator (the inverter configured as an on/off switch for converting the direct current output into a train of current pulses), and a step-up transformer including a primary coil coupled to the electrical generator and the inverter for providing a circuit path for the train of current pulses and a secondary coil for converting the train of current pulses into an AC output voltage of a predetermined voltage level, as a function of at least the number of turns forming the secondary coil.

Other embodiments of the present invention take the form of a system for converting mechanical energy to electrical energy for powering prosthetic and orthotic devices, where the system comprises a compression component for providing circulation of an included fluid upon the application of a force applied thereto, the mechanical energy harvesting apparatus, as described above, with the harvesting apparatus coupled to the compression component through an inlet fluid channel and an outlet fluid channel, with the AC output voltage of the harvesting apparatus used to control electrical and electro-mechanical components of the devices.

Other and further embodiments and applications of the present invention will become apparent during the course of the following discussion and by reference to the accompanying drawings.

BRIEF DESCRIPTION OF THE DRAWINGS

Referring now to the drawings, where like numerals represent like parts in several views:

FIG. 1 is an isometric view of an exemplary mechanical energy harvesting apparatus formed in accordance with one or more embodiments of the present invention for converting mechanical energy into electrical energy FIG. 2 is an electrical schematic depiction of the operation of the apparatus shown in FIG. 1;

FIG. 3 is a cut-away view of the electrical generator 12 and associated primary coil portion of the apparatus shown in FIG. 1;

FIG. 4 is an isometric view of a portion of the electrical generator, including the cylindrical chamber and associated inverter component;

FIG. 5 is a sectional view of the illustration in FIG. 4, showing in particular the position of the electrical inverter within the chamber outlet port

FIG. 8 is an exploded view of the collection of components forming the electrical generator, as described individually above in FIGS. 3-7

FIG. 9 is an exploded view of an alternative embodiment of the electrical inverter;

FIG. 12 presents an isometric view of an alternative embodiment of the present invention, referred to as an "indirect" energy harvester;

DETAILED DESCRIPTION

Figure 7:
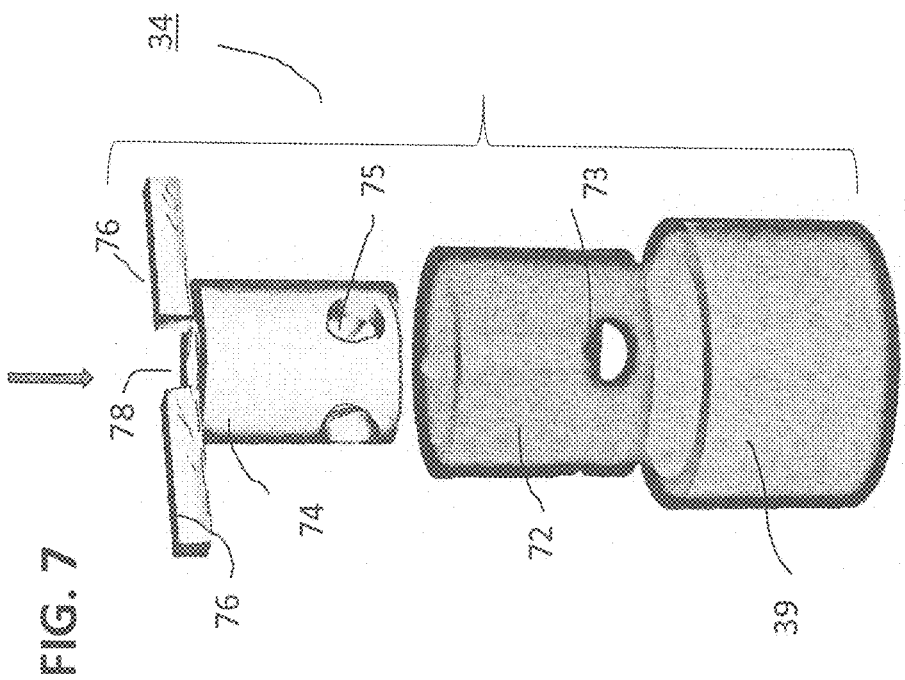
FIG. 7 is an exploded view of a specific configuration of an exemplary inverter formed in accordance with the present invention.

FIG. 1 is an isometric view of an exemplary mechanical energy harvesting apparatus 10 formed in accordance with one or more embodiments of the present invention for converting mechanical energy into electrical energy. FIG. 2 is an electrical schematic depiction of the operation of apparatus 10. Referring to FIG. 1, apparatus 10 is shown as comprising an electrical generator 12, the output of which is connected to a primary coil 14 of an electrical transformer 16. The outputs 18, 20 of a secondary coil 22 of transformer 16 are thereafter connected to a useful electrical load (not shown).

Referring to the schematic of FIG. 2, a "liquid rotor" (as MI be explained in detail hereinbelow) portion of generator 12 is used to generate a DC current output. The DC current is first directed through an inverter 24 and then to primary coil 14 of transformer 16. Inverter 24 functions as a switch, cycling between "open" and "closed", creating a train of current pulses as the output of inverter 24. The pulse train is shown in FIG. 2. Transformer 16 receives this pulse train and functions as a step-up transformer to increase the voltage swing between the minimum and maximum values of the input current pulses, thus providing an AC output at the desired level (e.g., ±x volts).

FIG. 3 is a cut-away view of electrical generator 12 and associated primary coil 14 (where secondary coil 22 and magnetic core 17 have been removed for clarity). The cross-sectional view of FIG. 3 illustrates a cylindrical chamber 30 included within electrical generator 12. As will be discussed below, a conductive fluid is introduced into cylindrical chamber 30, where the swirling motion of the conducting fluid functions as a "liquid rotor" and in the presence of a surrounding magnetic field generates electrical energy from this motion. The conducting fluid can be any fluid that has high electrical conductivity, such as an electrolyte solution, a molten salt, or a liquid metal. The preferred material for the conducting fluid is a eutectic alloy of indium, gallium, and tin.

Also illustrated in FIG. 3 is a pair of electrodes 38, 39 associated with generator 30 that provide the current path between generator 30 and primary coil 14 of transformer 16. In particular, electrode 38 is referred to as an "interior electrode", disposed within chamber 30. Electrode 38 is disposed along a portion of the sidewall of chamber 30 so that it will be in direct contact with the conductive fluid swirling within chamber 30. Electrode 39 is referred to as an "exterior electrode" and is disposed within a chamber outlet port 36 formed in the center of the bottom surface of chamber 30. Chamber 30 itself is surrounded by a magnetic circuit 32 that creates the magnetic field penetrating chamber 30 in the axial direction.

In this particular embodiment of the present invention, inverter 24 (see FIG. 2) takes the form of an electrical inverter 34 that is integrated into chamber outlet port 36. Electrical inverter 34 is coupled to electrode 39 and functions in the manner described below to provide the open/closed switching action required to create the train of current pulses.

FIG. 4 is an isometric view of chamber 30 and FIG. 5 is a sectional view of FIG. 4, both showing in particular the position of electrical inverter 34 within chamber outlet port 36. The conductive fluid enters circular chamber 30 through an inlet port 40 and leaves chamber 30 through chamber outlet port 36. FIG. 5 in particular clearly shows the location of outlet port 36, as well as electrodes 38 and 39. Also shown is a first conductor 44 that is connected between interior electrode 38 and primary coil 14, as well as a second conductor 45 that is connected between exterior electrode 39 and primary coil 14. The generated current flows along a signal path from interior electrode 38 along conductor 44 to primary coil 14, and after passing through primary coil 14 passes along conductor 45 to exterior electrode 39 (which is coupled to interior electrode via the conductive fluid and the inverter).

Figure 6:
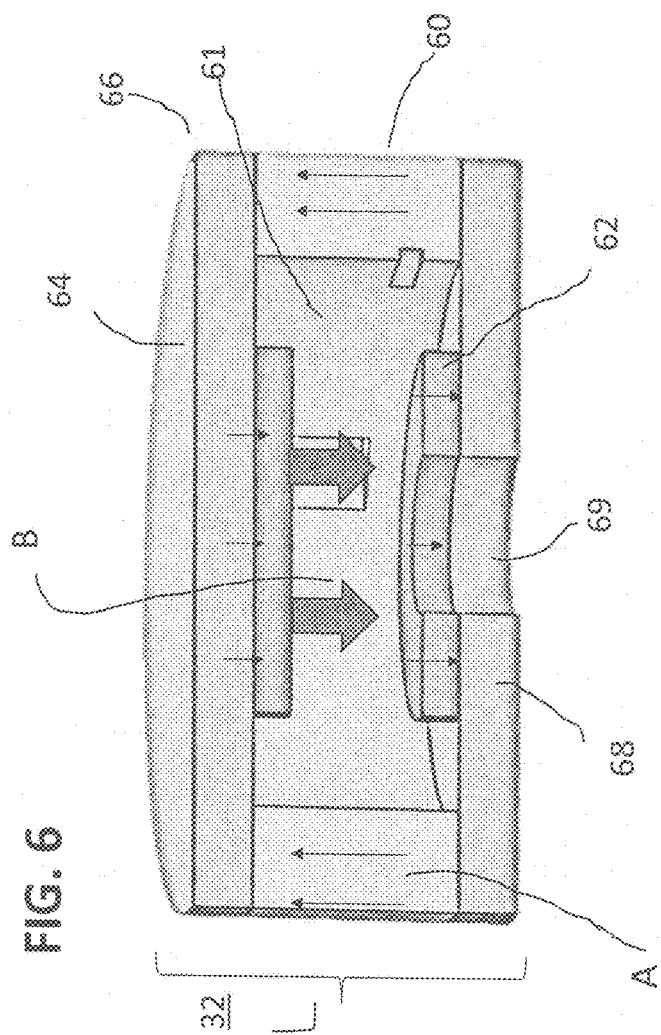
FIG. 6 presents a cross-sectional view of the magnetic circuit portion of the electrical generator of FIG. 3.

FIG. 6 presents a cross-sectional view of magnetic circuit 32 that surrounds chamber 30 and creates the magnetic field within which energy harvesting occurs. As shown, magnetic circuit 32 includes a pair of concentric ring magnets 60 and 62, disposed as outer ring 60 and inner ring 62. A disk magnet 64 is disposed as shown, in a spaced-apart relationship with inner ring 62, with a pair of opposing ferromagnetic plates 66 and 68 disposed as the upper and lower coverings for magnetic circuit 32. As shown, lower plate 68 includes an aperture 69, which is designed to align with both the center of inner ring 62 and port 36 of chamber 30 (see FIG. 3). Outer ring 60 is formed to include an aperture 61 to allow for the conductive fluid to pass through and enter chamber 30.

The direction of magnetization of the magnets 60, 62, and 64 is shown by arrows A in the illustration of FIG. 6, with the resulting magnetic field shown by heavier arrows B in the center region. Magnets 60, 62, and 64 can be made of any hard magnetic material, with the neodymium ceramic (NdFeB) being an exemplary preferred material. Ferromagnetic plates 66 and 68 can be made out of any soft ferromagnetic material, with the low-carbon steel AISI 1018 being one exemplary preferred material.

FIG. 7 is an exploded view of a specific configuration of inverter 34. As shown, inverter 34 comprises exterior electrode 39, a stationary member 72 disposed within electrode 39 and a rotational member 74 disposed within stationary member 72. Rotational member 74 comprises a pair of perpendicular arms 76 that interact with the moving conductive fluid so as to provide rotation of member 74. In use, rotational member 74 is adapted to freely rotate within stationary member 72. Stationary member 72 is not intended to rotate with respect to electrode 39. Members 72 and 74 are made of a dielectric material while electrode 39 is made of a conductive material.

As shown in FIG. 7, stationary member 72 is formed to include two sets of holes 73, and rotational member 74 is formed to include two sets of holes 75. When these holes are aligned, the conductive fluid that fills a central channel 78 of inverter 34 penetrates the holes and is allowed to contact electrode 39. Therefore, when aligned in this manner, electrical current can flow from central channel 78 to electrode 39 (inverter 34 thus defined as being in the "closed" position). Alternatively, when these holes are misaligned, the conductive fluid has no access to electrode 39 and, thus no electrical current can flow (inverter 34 defined as being in the "open" position). In accordance with this embodiment of the present invention, the interaction of arms 76 with the conductive fluid provides the movement of rotational member 74 so as to create the alternating patterns of "alignment" and "misalignment" of holes 73 and 75, thus producing the train of current pulses (as shown in FIG. 2).

FIG. 8 is an exploded view of the collection of components forming electrical generator 12, as described individually above in association with FIGS. 3-7. The relative sizes of the various components is evident in this view, particularly how rotational member 74 of inverter 34 fits within electrode 39, which in turn fits within outlet port 36 of chamber 30. Inlet port 40, associated with chamber 30, is also clearly shown in this view.

In operation of this embodiment of the present invention, as shown in FIGS. 3-8, energy harvesting is performed via the circulation of the conductive fluid within chamber 30. The conductive fluid supplied to inlet port 40 enters chamber 30 through an opening 42 and forms a rotating swirling flow indicated by the arrows shown in FIG. 4, creating the "liquid rotor". The fluid eventually exits chamber 30 through outlet port 36. Since the flow of the conducting fluid occurs in the presence of a magnetic field from magnetic circuit 32 that permeates chamber 30 in the axial direction (as shown in FIG. 6), a voltage differential is developed between the center of the chamber and its periphery.

As best shown in FIGS. 4, 5 and 8, the periphery of chamber 30 incorporates interior electrode 38, which is connected to primary coil 14 through conductor 44. The center of chamber 30 is connected to exterior electrode 39 (via inverter 34), which is incorporated into chamber outlet port 36. Electrode 39 is, in turn, connected to primary coil 14 through conductor 45. This combination results in a closed electrical circuit that consists of the conductive fluid enclosed in chamber 30, primary coil 14, electrodes 38, 39, and conductors 44, 45. The closed electrical circuit is capable of supporting electrical current excited by the voltage differential between the center and the periphery of chamber 30. Chamber outlet port 36 incorporates rotational (inverter) member 34, which serves as electrical inverter 24 in this embodiment. As described above in association with FIGS. 2 and 6, the purpose of the inverter is to convert the DC current generated by a constant voltage differential between the center and the periphery of the chamber into a train of current pulses that can be used to form an AC current as the output of transformer 16.

FIG. 9 is an exploded view of an alternative embodiment of the electrical inverter, depicted in this illustration as inverter 34A. In this configuration, inverter 34A includes a stationary member 72A (with a plurality of holes 73A) and a rotational member 74A (with a plurality of holes 75A). Rotational member 74A is shown as including a plurality of arms 76A radiating outward from the center of rotational member 74A. In this particular embodiment, inverter 34A is disposed over a cylindrical chamber 30A, where the combination of these two components produces a train of current pulses in the presence of a magnetic field, for reasons as described above. Again, the alternating alignment and misalignment of the holes in the stationary and rotational members provides for the alternating opening and closing of the circulating current path between chamber 30A and the associated transformer primary coil (not shown).

Figure 10:
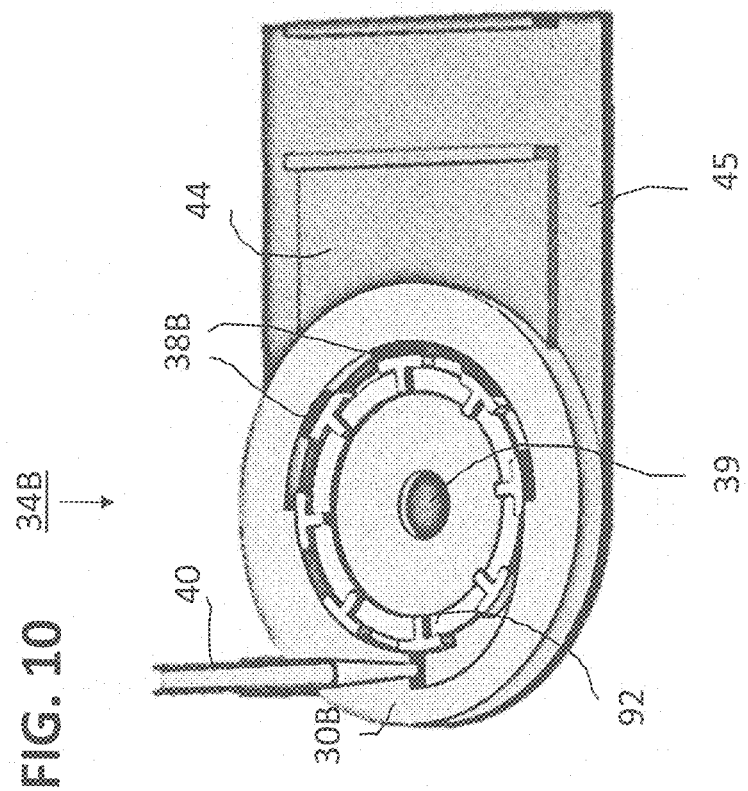
FIG. 10 is an isometric view of yet another electrical inverter configuration.

FIG. 10 is an isometric view of yet another electrical inverter configuration, here denoted as 346. Unlike the embodiment of the inverters shown in FIGS. 7 and 9 (which has a rotational member 74, 74A disposed in the central part of chamber 30, 30A), the exemplary embodiment shown in FIG. 10 comprises a rotational member 90 disposed near the periphery of a cylindrical chamber 306 and adapted to rotate freely under the influence of the swirling motion of the conductive fluid filling chamber 30B. In this exemplary embodiment, inverter 346 is positioned to provide switching in conjunction with interior electrode 38. In accordance with this particular embodiment of the present invention, interior electrode 38 is shown as comprising a set of spaced-apart electrode segments 386.

Rotational member 90 is shown as including a plurality of blocking elements 92 disposed in a spaced-apart configuration around the periphery of member 90. In accordance with the operation of inverter 346 of this specific embodiment of the present invention, as member 90 rotates under the influence of the swirling motion of the conductive fluid filling chamber 306, blocking elements 92 periodically cover and uncover the set of electrode segments 388. In positions where the plurality of blocking elements 92 cover the set of electrode segments 386, no electrical contact exists between the conductive liquid filling chamber 30 and electrodes 38B (i.e., inverter 38B is in the "open" position). Alternatively, when blocking elements 92 have rotated such that they no longer cover electrodes 388, the conductive fluid is permitted to come into direct contact with electrodes 386, thereby establishing a good electrical contact (inverter 388 thus being the "closed" position). The continuous switching between open and "closed" thus provides the train of current pulses used by transformer 16 to provide an AC output current.

Figure 11:
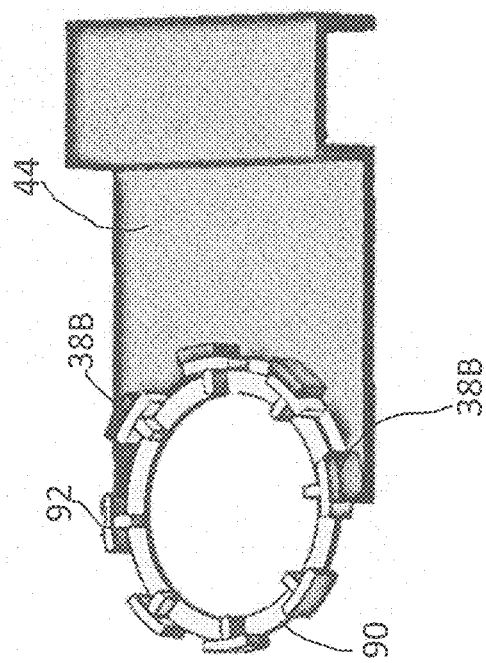
FIG. 11 depicts a portion of the electrical inverter configuration of FIG. 10, illustrating only the rotational member (with its associated plurality of blocking elements) and a set of electrode segments.

This action of establishing and breaking electrical contact is further illustrated in FIG. 11, where only rotational member 90 with its associated plurality of blocking elements 92 and the set of electrode segments 388 (coupled to conductor 44 and primary coil 14) is shown. FIG. 11 clearly shows that no electrical current can flow into conductor 44 when the plurality of blocking elements 92 is aligned with the set of electrode segments 38B. Conductor 45 is shown in FIG. 10 as connecting primary coil 14 to electrode 39 incorporated into outlet port 36 of chamber 30. This results in a closed electrical circuit which consists of the conductive fluid enclosed in chamber 30, primary coil 14, and connecting electrodes/conductors 38, 44, 45, and 39. This closed circuit is capable of supporting electrical current excited by the voltage differential between the center and the periphery of the conducting fluid filling chamber 30. Rotational member 90 serves as electrical inverter 348 converting the DC current, generated by a constant voltage differential between the center and the periphery of chamber 30, into a series of current pulses pulsating current that can be used by transformer 106 to generate the desired AC voltage output.

The materials for the set of electrodes 38B and electrode 39 (as ell as the conductive fluid) should be selected in a way that ensures low resistance electrical contact between the electrodes and the fluid, as well as the absence of undesirable chemical or physical interaction between them. This is particularly important in case where a liquid metal serves as a conductive fluid. Common room-temperature liquid metals such as mercury or gallium-indium alloys tend to readily form amalgams with metals that are commonly used for electrodes (e.g., copper or aluminum), rendering the electrodes mechanically unstable. On the other hand, the electrodes made out of the metals that do not react with the liquid metal, tend to eventually develop a thin layer of metal oxide on the electrode surface, thus dramatically increasing the resistance of the liquid-electrode interface. It has been found experimentally that there exists a set of solid alloys suitable for the electrodes preparation that are wetted by the liquid metal but are not truly amalgamated, thus enabling stable electrodes with a good electrical contact and no oxide formation. The electrodes can be either made of these alloys or coated with a thin layer of these alloys using such techniques as electroplating or sputtering. A specific example of such alloys is a group of copper-nickel alloys with the nickel content n excess of 5% by weight or copper-chromium alloys with the chromium content in excess of 0.5% by weight. These alloys were found to form a stable very low resistance interface with the mercury and gallium-indium liquid alloys.

FIG. 12 presents an isometric view of an alternative embodiment of the present invention, hereinafter referred to as an "indirect" energy harvester. In this embodiment, an apparatus 100 for converting mechanical energy into electrical energy comprises an electrical generator 102, the output of which is connected to a primary coil 104 of an electrical transformer 106. Outputs 108 and 110 of a secondary coil 112 of transformer 106 are, connected to the useful electrical load (not shown). In accordance with this "indirect" embodiment of the present invention, the mechanical energy is supplied to electrical generator 102 by the flow of a driving fluid (separate from the conductive fluid) introduced to generator 102 through an inlet port 114. The driving fluid imparts a circular motion to internal members of generator 102 (as described below), where the circulating driving fluid then exits generator 102 through an outlet port 116.

Figures 13, 14, 15:
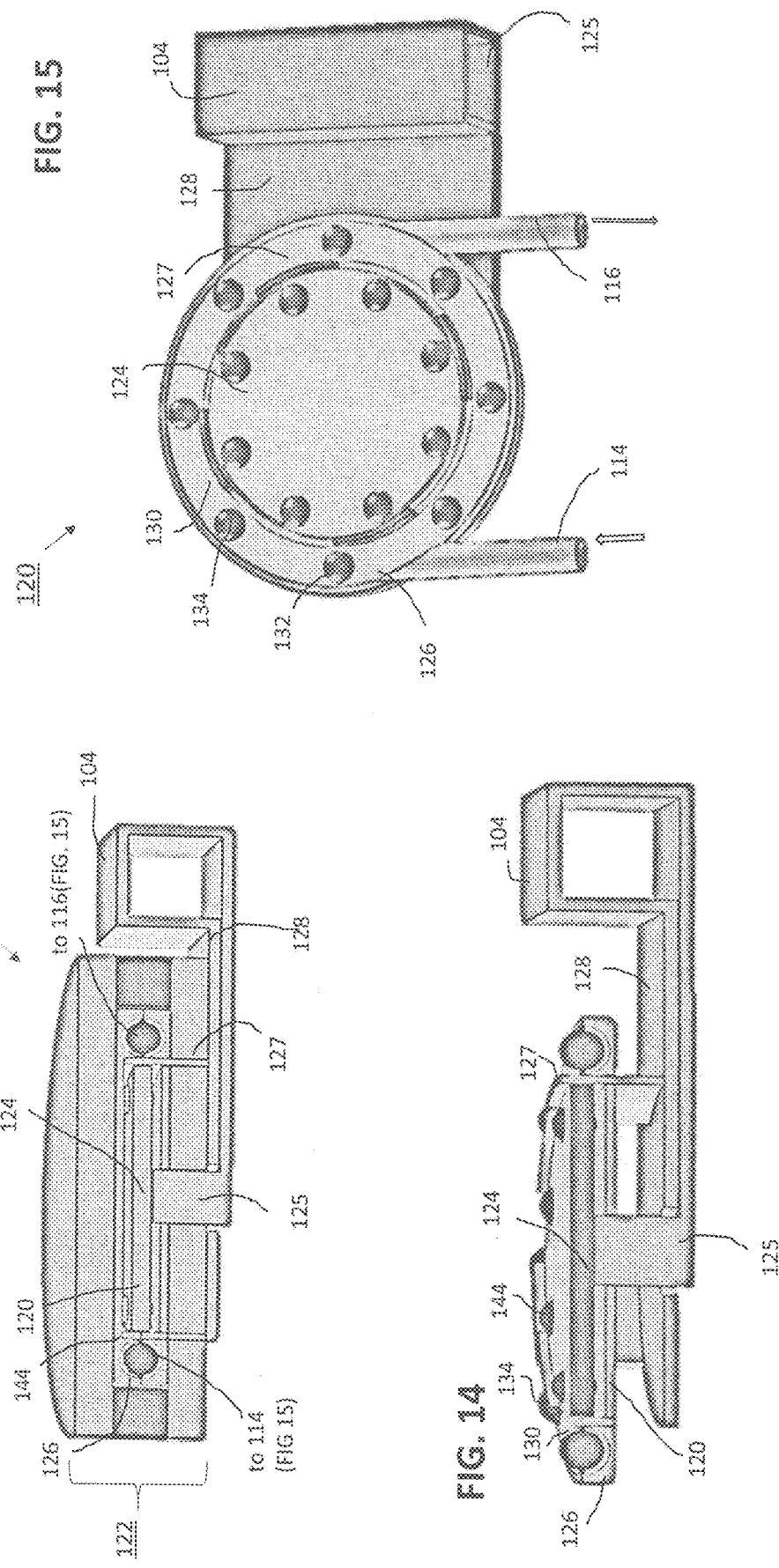
FIG. 13 is a cross-sectional view of the electrical generator and primary coil of the indirect energy harvester of FIG. 12.
FIG. 14 is a depiction of the cross-sectional view of FIG. 13, with the magnetic circuit removed for clarity.
FIG. 15 presents a "top" isometric view of portions of the indirect electrical generator.

FIG. 13 is a cross-sectional view of electrical generator 102 and primary coil 104. This cross-sectional view shows the position of a sealed cylindrical chamber 120 within generator 102. In accordance with this embodiment of the present invention, a conducting fluid is enclosed (sealed) within this chamber, creating the "liquid rotor" for generating electrical energy from mechanical motion. A magnetic circuit 122 is shown as surrounding sealed chamber 120 and creating a magnetic field in the axial direction through sealed chamber 120. The rotational motion of the conducting fluid within chamber 120 thus occurs within the magnetic field penetrating the chamber in the axial direction.

FIG. 14 is a depiction of the cross-sectional view of FIG. 13 with magnetic circuit 122 removed for clarity. Particularly shown in this view is a conductive rotational member 124 that is disposed within sealed chamber 120 and adapted to freely rotate around its vertical axis. As will be described in detail below, rotational member 124 serves as an electrical inverter in the closed circuit current path between chamber 120 and primary coil 104. The conducting fluid can be any fluid that has high electrical conductivity, such as an electrolyte solution, a molten salt, or a liquid metal. The preferred material for the conducting fluid is a eutectic alloy of indium, gallium, and tin, Also shown in FIGS. 13 and 14 is a circular channel 126, which is, disposed to surround sealed chamber 120. Inlet and outlet ports 114, 116 are shown as coupled to circular channel 126. In accordance with this embodiment of the present invention, the driving fluid passing through inlet port 114 is introduced into circular channel 126, propagates around the periphery of channel 126, and then exits via outlet port 116. The motion of the driving fluid imparts a rotational motion to the conductive liquid within sealed chamber 120 in the manner described in detail below.

Figure 16:
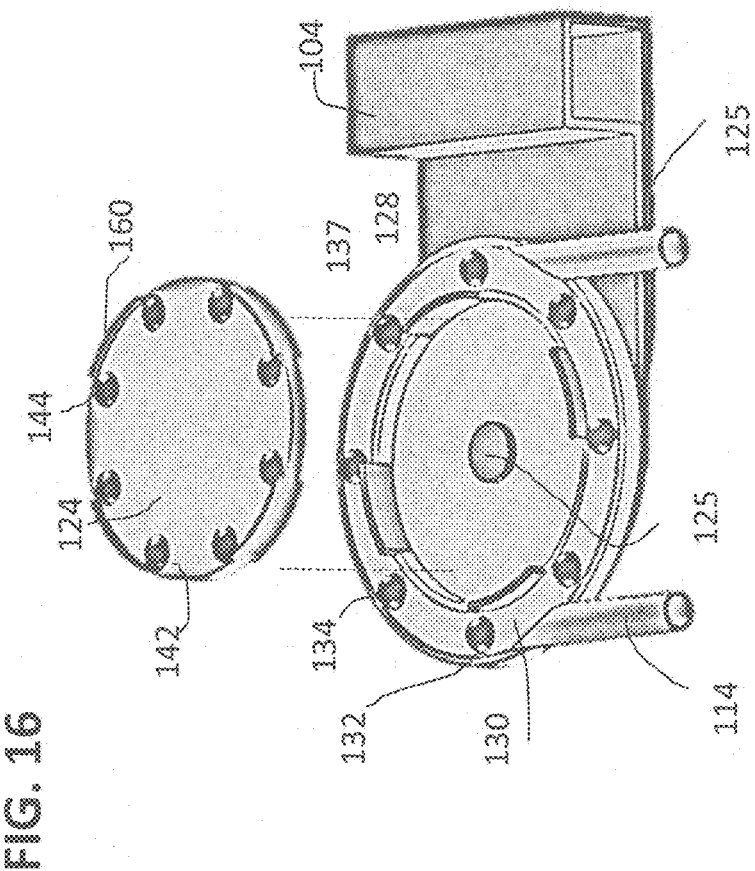
FIG. 16 is an exploded view of the isometric illustration of FIG. 15.

FIG. 15 presents a "top" isometric view of portions of indirect electrical generator 102, with an exploded view shown in FIG. 16. As described above, the driving fluid is supplied to circular channel 126 via inlet port 114, rotates around the periphery of channel 126, and then exits channel 126 through outlet port 116. A circular ring 130 is disposed inside channel 126 and is adapted to rotate freely in response to the force exerted by the flow of the driving fluid. The driving fluid can be any low viscosity fluid, such as water, oil, or any common hydraulic fluid. Circular ring 130 has a plurality of holes 132 located periodically around its circumference. A plurality of ferromagnetic balls 134 is disposed in holes 132, each ball 134 being adapted to freely rotate inside circular ring 130. Balls 134 can be made out of any soft ferromagnetic material, with the low-carbon steel AISI 1018 being one exemplary preferred material. Ring 130 can be made of any non-magnetic material, such as a suitable plastic.

As best seen in FIG. 16, channel 126 surrounds sealed cylindrical chamber 120 (which is filled with the conductive fluid). As mentioned above, a rotational member 124 is disposed in sealed chamber 120 and is adapted to freely rotate inside the chamber. Rotational member 124 has a plurality of holes 142 located periodically around its periphery. A plurality of ferromagnetic balls 144 is disposed in holes 142, each ball 144 being adapted to freely rotate inside rotational member 124. Balls 144 can be made out of any soft ferromagnetic material, with the low-carbon steel AISI 1018 being an exemplary preferred material. Rotational member 124 can be made of any non-magnetic material, with high electrical conductivity such as copper or aluminum.

Figure 17:
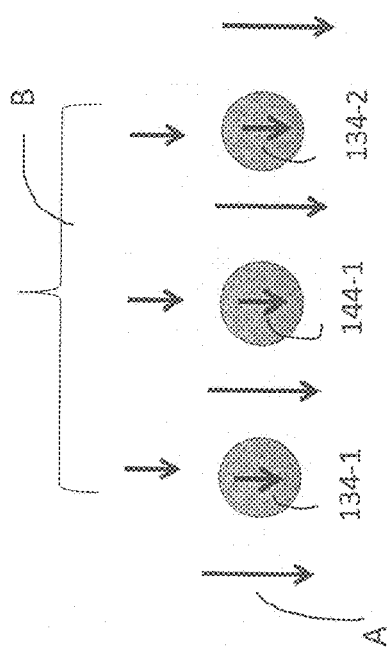
FIG. 17 is a diagram showing the direction of the magnetic field created between the circular ring and the sealed chamber in the indirect energy harvester of the present invention.

The pluralities of balls 134 and 144 are influenced by the presence of the magnetic field which permeates channel 126 and sealed chamber 120 in the axial direction. As schematically shown in the view of FIG. 17, the magnetic field indicated by the arrows A induces magnetization (shown by arrows B) in neighboring balls 134-1, 144-1, and 134-2. It is assumed that balls 134-1 and 134-2 are disposed on opposite sides of circular ring 130, while ball 144-1 is disposed in rotational member 124. Due to this induced magnetization, balls 134-1, 144-1, and 134-2 exhibit a strong mutual repulsion. This means that there exists an effective magnetic coupling between circular ring 130 and rotational member 124. In equilibrium, ring 130 and rotational member 124 will position themselves such that the plurality of balls 134 is shifted with respect to the plurality of balls 144 by one half of the period. Any rotation of ring 130 will cause a corresponding rotation of member 124, and, as the result, the rotational flow of the conductive fluid inside chamber 120.

Since the rotation of member 124 and associated rotational flow of the enclosed conducting fluid occur in the presence of a magnetic field which permeates chamber 120 in the axial direction, a voltage differential is developed between the center of chamber 120 and its periphery.

As also best seen in the exploded view of FIG. 16, the required inverter action used to "open" and "close" the electrical circuit in an alternating pattern is provided by a plurality of spaced-apart electrodes 127 disposed around the periphery of sealed chamber 120. Electrodes 127 are connected to primary coil 104 through a conductor 128. An electrode 125 disposed at the center of chamber 120 is connected to primary coil 104 through a conductor 126. This results in a closed electrical circuit which consists of the conductive fluid and rotational member 124 (enclosed within sealed chamber 120), primary coil 104, and the connecting electrodes/conductors. This closed circuit is capable of supporting electrical current excited by the voltage differential between the center and the periphery of chamber 120.

Continuing with the description of the inverter action, rotational member 124 is shown as comprising a plurality of dielectric blocking elements 160 disposed around its periphery in a spaced-apart configuration. As member 124 rotates in response to the rotational motion of the combination of circular ring 130 and the driving fluid, blocking elements 160 periodically cover and uncover the plurality of spaced-apart electrodes 127. In positions where the plurality of blocking elements 160 covers the plurality of electrodes 127, no electrical contact exists between the conductive liquid filling chamber 120 and electrodes 127 (inverter creates an "open" circuit). Alternatively, when member 124 has rotated a bit more, a configuration is created where blocking elements 160 no longer cover electrodes 127. In this case, the conductive fluid remains in direct contact with the electrodes 127, establishing a good electrical contact (creating a closed circuit). In accordance with this embodiment of the present invention therefore, rotational member 124 serves as an electrical inverter, converting the DC current generated by a constant voltage differential between the center and the periphery of chamber 120 into a train of current pulses that is used by transformer 106 to create the desired AC output voltage.

Figure 18:
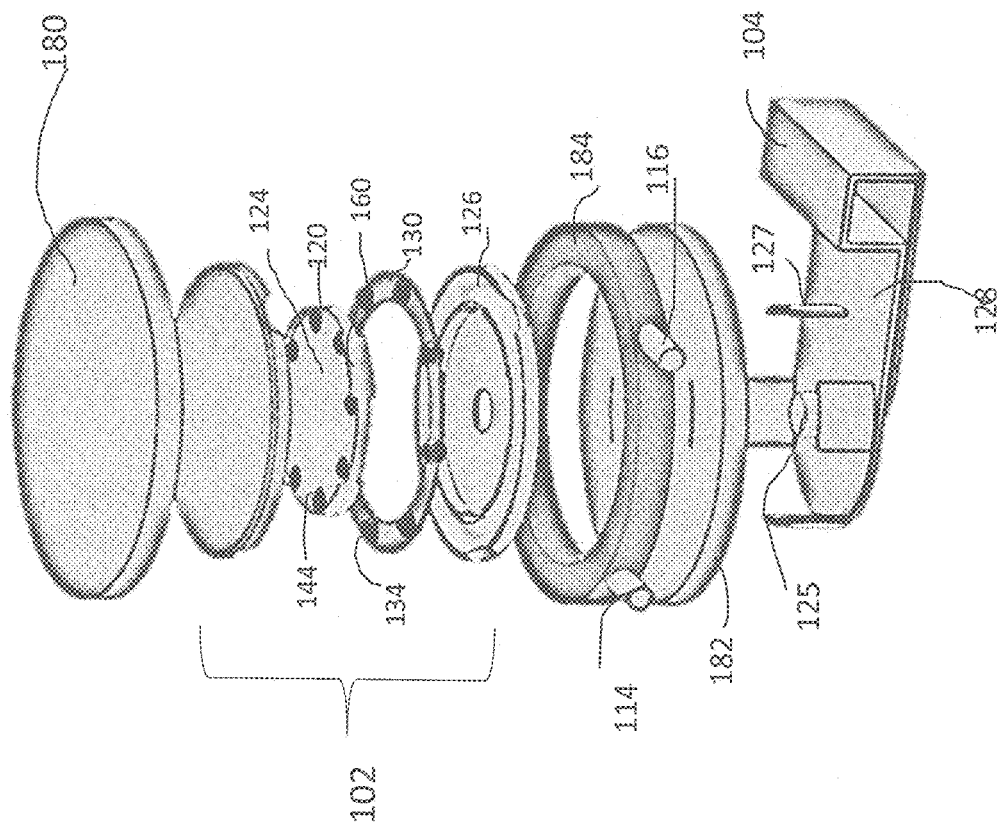
FIG. 18 is an exploded view of the "indirect" embodiment of the present invention, also showing the position of the magnetic plates used to cover the top and bottom surfaces of the combination of the circular channel and sealed chamber.

FIG. 18 is an exploded view of this "indirect" embodiment of the present invention, also showing the position of magnetic plates 180 and 182 to cover the top and bottom surfaces of the combination of channel 126 and sealed chamber 120. As shown, input port 114 and outlet port 116 are formed within a magnetic ring 184 disposed to surround channel 126 (the driving fluid introduced into input port 114 thereafter directed to circulate around channel 126 in the manner described above).

The materials for the rotational member 124, the plurality of electrodes 127 and electrode 128 (as well as for the conductive fluid that fills sealed chamber 120) should be selected in a way that ensures low resistance electrical contact between the electrodes and the fluid, as well as the absence of undesirable chemical or physical interaction between them. This is particularly important in case where a liquid metal serves as a conductive fluid. Common room-temperature liquid metals such as mercury or gallium-indium alloys tend to readily form amalgams with metals that are commonly used for electrodes such as copper or aluminum, rendering the electrodes mechanically unstable. On the other hand, the electrodes made out of the metals that do not react to the liquid metal tend to eventually develop a thin layer of metal oxide on the electrode surface thus dramatically increasing the resistance of the liquid-electrode interface. It was found experimentally that there exists a set of solid alloys suitable for the electrodes preparation that are wetted by the liquid metal but are not truly amalgamated, thus enabling stable electrodes with a good electrical contact and no oxide formation. The electrodes can be either made of those alloys or coated with a thin layer of those alloys using such techniques as electroplating or sputtering. A specific example of such alloys is a group of copper-nickel alloys with the nickel content in excess of 5% by weight or copper-chromium alloys with the chromium content in excess of 0.5% by weight. These alloys were found to form a stable very low resistance interface with the mercury and gallium-indium liquid alloys.

As mentioned above, one significant application of the energy harvesting device of the present invention is in the field of "smart" prosthetics. Over one million persons in the US live with limb loss with an estimated 100,000 new cases each year, over 80% involving the lower limb. The most important mobility issues are discomfort, stability and fatigue. Below-knees amputees expend at least 20% more energy than able-bodied persons to walk at the same speed, regardless of the type of foot prosthesis. Amputees also have greater difficulty with standing, relying more on vision for balance. Dysvascular amputees, accounting for most new cases, also have reduced somatosensation, impairing stability further and leading to more frequency falls. These amputees need a compliant prosthesis to avoid high socket pressures in walking, but the resulting compliant base of support may be detrimental for maintaining standing balance. For more active amputees, a stiffer foot supports weight better for faster walking, but the resulting stiff base can feel uncomfortable in standing if the amputee expects greater freedom of motion. Given that each individual has different needs at different times, there exists a need for prosthetic feet that can adapt their properties to match these needs.

Recently, several prosthetic devices have added some adaptability through microprocessor ankles, ranging from robotically controlled versions to semi-active controllable dampers. However, they all share one weakness: they require a battery to operate, and the battery must be charged regularly. This requirement can be problematic for users, so much so that manufacturers are actively focusing on finding solutions to either extend battery life or power their devices through onboard energy harvesting.

Figure 21:
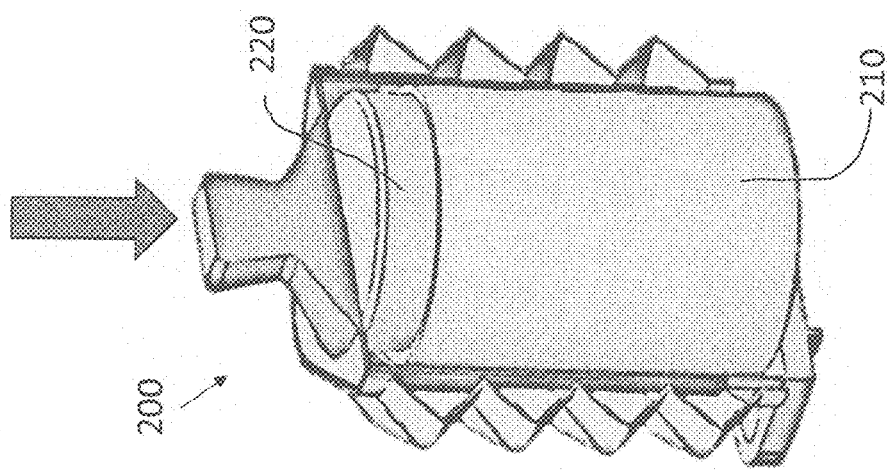
FIG. 21 is an interior view of the system of FIG. 19, showing an exemplary mechanical energy harvesting apparatus and associated compression component.
Figure 20:
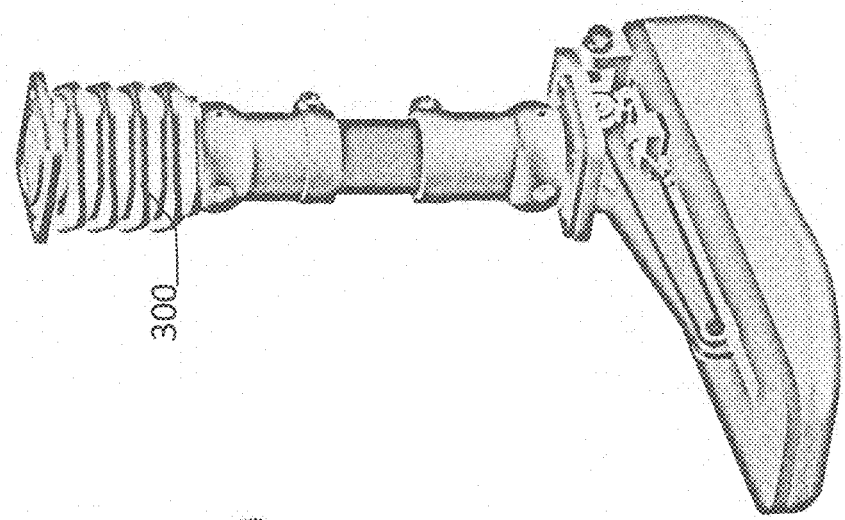
FIG. 20 illustrates an exemplary mechanical-to-electrical energy conversion system incorporated within a foot-ankle prosthetic device.
Figure 19:
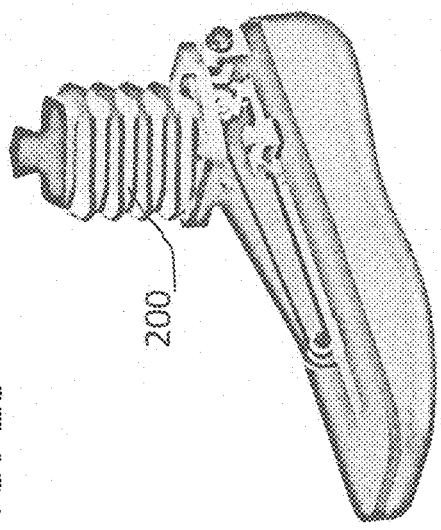
FIG. 19 illustrates an exemplary ankle-based mechanical-to-electrical energy conversion system formed in accordance with the present invention.

The "liquid rotor"-based magneto-hydro-dynamic (MHD) harvesting device of the present invention addresses this need to provide onboard energy harvesting within an electronically-controlled prostheses including, but not limited to foot-ankle prosthetic devices and ankle-knee prosthetic devices (as well as "smart" orthosis devices). FIG. 19 illustrates an exemplary ankle-based mechanical-to-electrical energy conversion system 200 formed in accordance with the present invention, and FIG. 20 illustrates an exemplary mechanical-to-electrical energy conversion system 300 incorporated within a foot-ankle prosthetic device. FIG. 21 is an interior view of system 200, showing an exemplary mechanical energy harvesting apparatus 210 and associated compression component 220. As will be discussed below, the necessary movement of a conductive fluid for the liquid rotor within apparatus 210 is provided by the expansion/compression of component 220, such as when an individual applies a force to system 200 when walking.

Figure 22:
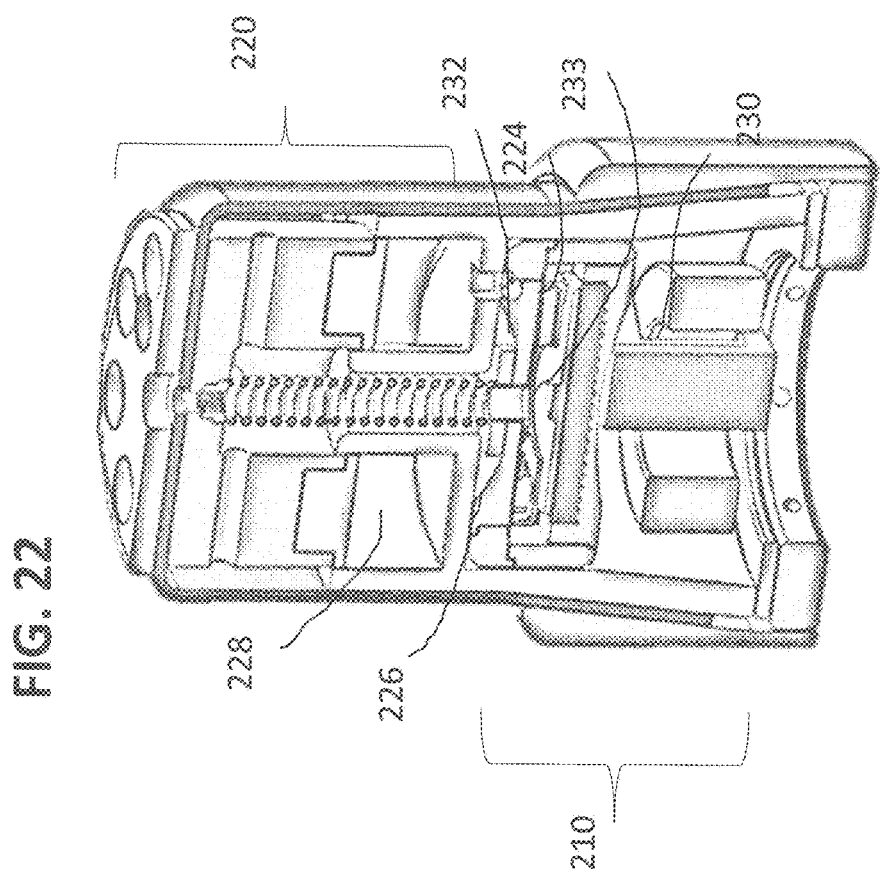
FIG. 22 is a cut-away view of the system of FIG. 19, showing an exemplary, liquid-rotor-based electrical generator formed in accordance with the present invention.

FIG. 22 is a cut-away view of system 200, showing an exemplary, liquid-rotor-based electrical generator 224 formed in accordance with the present invention (which may comprise either a direct or indirect generator, as described above). Associated with electrical generator 224 is a transformer 230, where in this prosthetic-based system configuration transformer 230 is disposed below electrical generator 224. Additionally, it is shown that compression component 220 is disposed above electrical generator 224, with all three elements providing a relatively compact configuration.

In a "direct" electrical generator configuration, the conductive liquid is stored within compression component 220 and directed through a cylindrical chamber 226 to create electrical energy in the presence of an inverter 232 and magnetic circuit 233. The AC output current from transformer 230 is thereafter applied to electronics (not shown) used to control the specific properties of the prosthetic device. In an "indirect" embodiment, the working fluid is stored within compression component 220 and the conductive fluid is stored in a sealed chamber 226 within electrical generator 224. In the view of FIG. 22, compression component 220 is fully expanded, showing a reservoir 228 used to hold the fluid.

Figure 23:
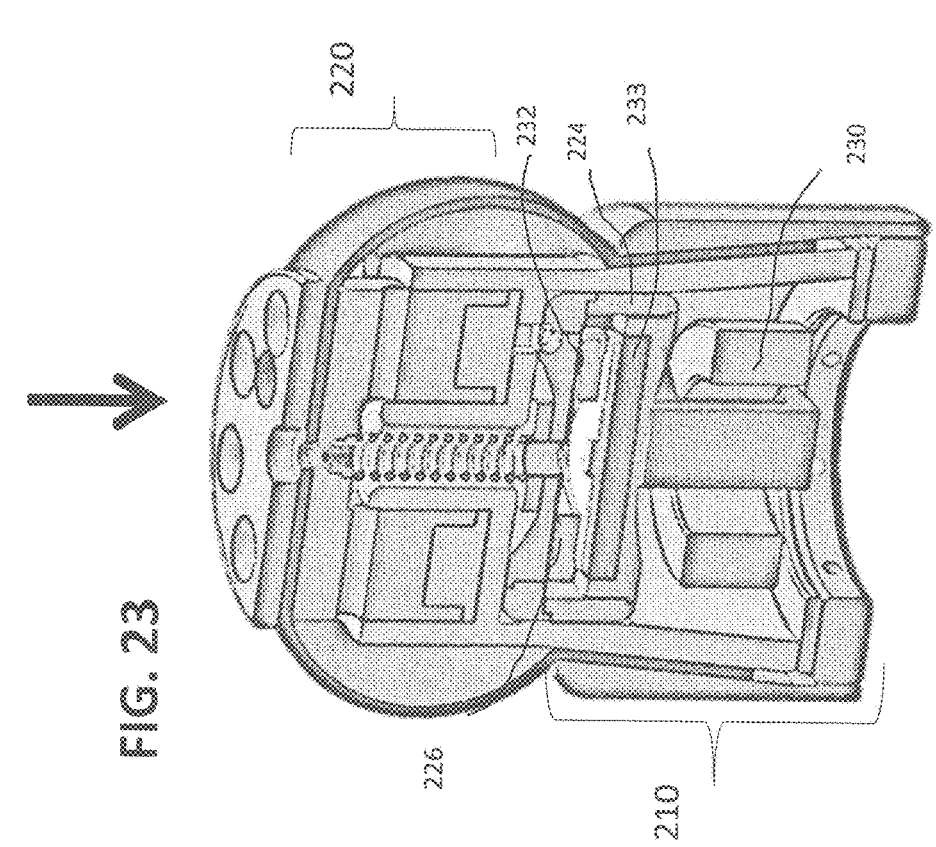
FIG. 23 illustrates the same arrangement as shown in FIG. 22, but in this case with a force applied to the compression component, as occurs when the user exerts a force against the prosthetic device.

FIG. 23 illustrates the same arrangement, but in this case with component 220 compressed, which occurs as the user exerts a force against the prosthetic device. Here, the liquid rotor is activated, creating electrical energy from the revolving motion of the conductive fluid within the chamber (which is surrounded by a magnetic field, as mentioned above).

Figure 24:
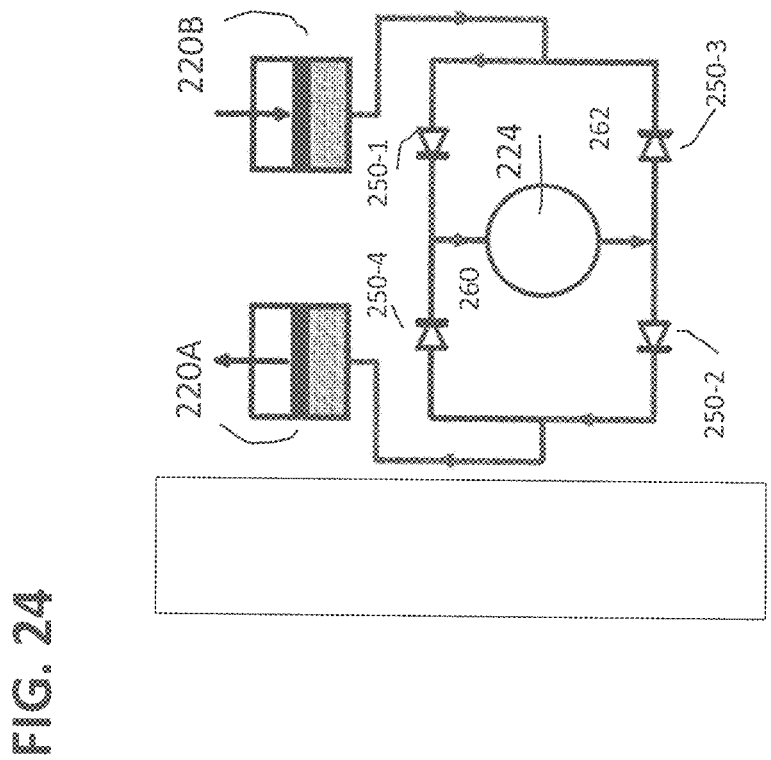
FIG. 24 illustrates one exemplary configuration for achieving continuous charging within the device as shown in FIG. 21, using a plurality of check valves to control the flow of the liquid.

It is also possible to modify the device as shown in FIGS. 22 and 23 to allow for energy generation during both flow directions; that is, during the "direct" flow direction (compression, when the fluid moves from the compression chamber to the electrical chamber) and "reversed" flow direction (when the fluid returns to the compression chamber during the removal of force and expansion of the compression chamber). This can be achieved by incorporating a set of check valves with the energy harvesting device so as to ensure unidirectional flow of the conductive fluid through the chamber at all times. FIG. 24 illustrates one exemplary configuration for achieving this continuous charging embodiment. For this embodiment, a pair of separate compression chambers is used, shown as compression components 220A and 220B. The compression components are connected to electrical generator 224 through a plurality of check valves 250 that control the fluid flow so that the fluid passes through generator 224 in a single direction (i.e., both input paths enter through the same inlet port, and both output paths exit through same outlet port). In the specific arrangement as shown in FIG. 24, component 220B is in compression, with the fluid (either conductive fluid or working fluid, as the case may be) flowing through a first check valve 250-1 coupled to an inlet port 260 of generator 224, and then exiting generator 224 via an outlet port 262. A second check valve 250-2 is also opened, directing the fluid flow into compression component 220A, as shown by the dotted line in FIG. 24. While not explicitly shown in FIG. 24, it is also to be understood that one or more adjustable flow valves may be used to control the fluid flow between compression component 220 and generator 224. That is, the flow velocity may be either increased or decreased, as desired, to change the duration of the energy generation time period.

Figure 26:
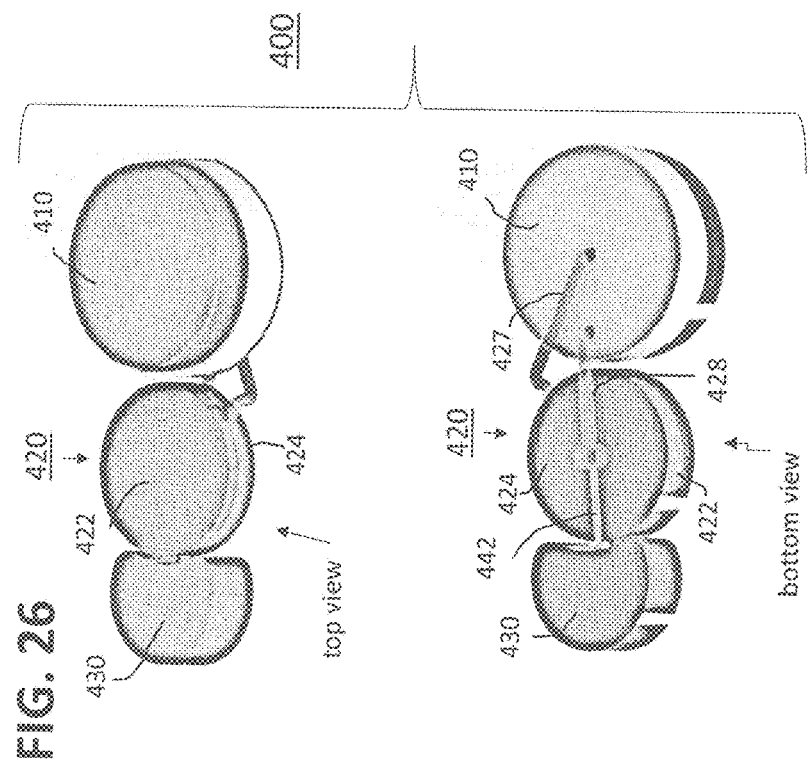
FIG. 26 contains top and bottom views of the internal components of the device as shown in FIG. 25.
Figure 25:
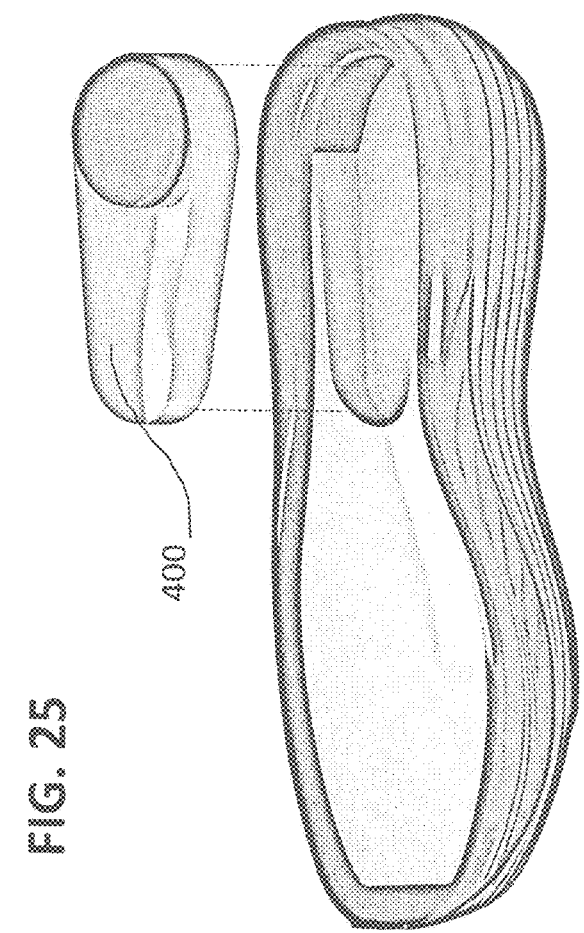
FIG. 25 illustrates an exemplary insole, formed to include a mechanical-to-electrical energy conversion system of the present invention within the heel region of the insole.
Figure 27:
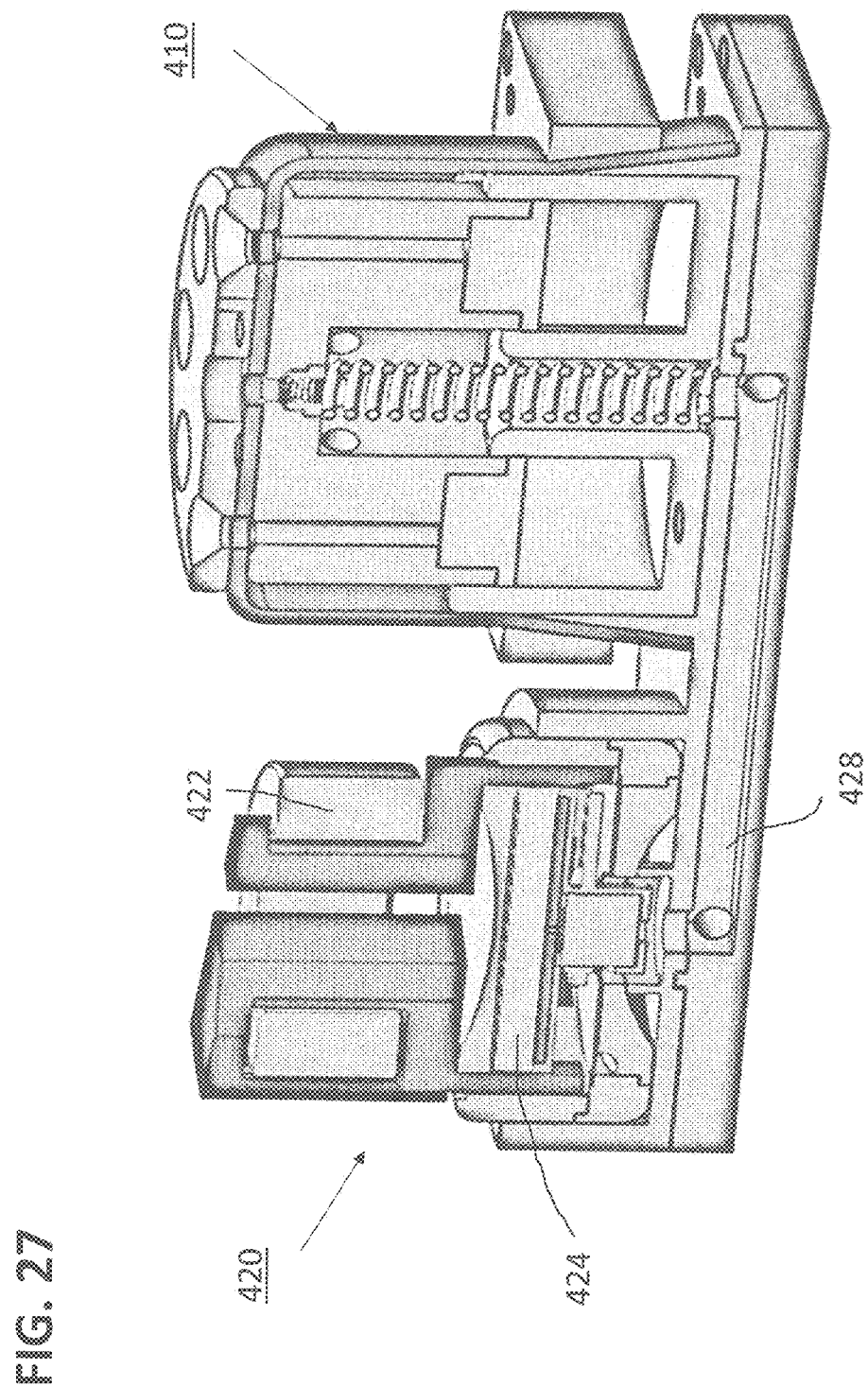
FIG. 27 is a cut-away side view of an exemplary embodiment of compression component and energy harvesting apparatus, as shown in FIG. 26.

Another application of the MHD energy harvesting device of the present invention is in the field of converting mechanical energy associated with walking into useable electrical energy. FIG. 25 illustrates an exemplary insole, formed to include a mechanical-to-electrical energy conversion system 400 within the heel region of the insole. FIG. 26 contains top and bottom views of the internal components of device 400, and FIG. 27 is a cut-away side view of an exemplary embodiment of compression component 410 and apparatus 420.

In contrast to the prosthetic configuration described above, system 400 includes a compression component 410 positioned adjacent to a mechanical energy harvesting apparatus 420, with a separate power electronics component 430 (which may include an energy storage device) coupled to the output of apparatus 420. Also in contrast to the above-described embodiment, apparatus 420 comprises a transformer 422 disposed above an electrical generator 424. A pair of channels 426, 428 are used to direct the flow of liquid between compression component 420 and apparatus 420. In particular, the bottom view of system 400 clearly shows channels 426 and 428. Electrical connection 442 between generator 420 and electronics 430 is also shown.

Although only selected preferred embodiments of the present invention have been described in detail here, those of ordinary skill in the art should understand that they could make various changes, substitutions and alterations herein without departing from the scope of the invention.

What is claimed is:

1. A system for converting mechanical energy to electrical energy for powering a prosthetic device, the system comprising:
 a compression component for providing circulation of an included fluid upon the application of a force applied thereto;
 a mechanical energy harvesting apparatus coupled to the compression component through an inlet fluid channel and an outlet fluid channel, the apparatus comprising
 an electrical generator coupled to the inlet and outlet fluid channels for converting mechanical energy into a direct current output, the electrical generating comprising a cylindrical chamber for providing a circular flow of a conductive fluid and a magnetic circuit disposed to surround the cylindrical chamber such that the presence of a moving conductive fluid creates an electrical current;
 an inverter coupled to the electrical generator, the inverter configured to function as an on/off switch for converting the direct current output into a train of current pulses; and
 a step-up transformer including
 a primary coil coupled to the electrical generator and the inverter for providing a circuit path for the train of current pulses and
 a secondary coil for converting the train of current pulses into an AC output voltage of a predetermined voltage level, as a function of at least the number of turns forming the secondary coil; and
 prosthetic electronic and electromechanical components coupled to the secondary coil for using the AC output voltage to operate the prosthetic device.

2. The system as defined in claim 1 wherein the electrical generator further comprises
 a pair of electrodes coupled to the cylindrical chamber, each electrode coupled to an opposing end termination of the primary coil of the step-up transformer, wherein the inverter is disposed along one signal path between an electrode and its associated primary coil end termination.

3. The system of claim 1 wherein the system further comprises
 a plurality of check valves coupled between the compression component and the electrical generator to provide unidirectional flow of fluid to the electrical generator during both compression and expansion of the compression component.

4. The system of claim 1 wherein the system further comprises
 an adjustable valve coupled between the compression component and the electrical generator to provide flow rate adjustment of the fluid flow to the electrical generator so as to modify the duration of the energy generation time.

5. A system for converting mechanical energy to electrical energy for powering an orthesis device, the system comprising:
 a compression component for providing circulation of an included fluid upon the application of a force applied thereto;
 a mechanical energy harvesting apparatus coupled to the compression component through an inlet fluid channel and an outlet fluid channel, the apparatus comprising
 an electrical generator coupled to the inlet and outlet fluid channels for converting mechanical energy into a direct current output, the electrical generating comprising a cylindrical chamber for providing a circular flow of a conductive fluid and a magnetic circuit disposed to surround the cylindrical chamber such that the presence of a moving conductive fluid creates an electrical current;
 an inverter coupled to the electrical generator, the inverter configured as an on/off switch for converting the direct current output into a train of current pulses; and
 a step-up transformer including
 a primary coil coupled to the electrical generator and the inverter for providing a circuit path for the train of current pulses and
 a secondary coil for converting the train of current pulses into an AC output voltage of a predetermined voltage level, as a function of at least the number of turns forming the secondary coil; and
 orthotic electronic and electromechanical components coupled to the secondary coil for using the AC output voltage to operate the orthesis device.

6. A footwear insole configuration for converting mechanical energy associated with human locomotion to electrical energy, the configuration comprising:
 a compression component, disposed within a heel region of the footwear insole, for providing circulation of an included fluid upon the application of a force applied thereto;
 a mechanical energy harvesting apparatus coupled to the compression component through an inlet fluid channel and an outlet fluid channel, the apparatus comprising an electrical generator coupled to the inlet and outlet fluid channels for converting mechanical energy into a direct current output, the electrical generating comprising a cylindrical chamber for providing a circular flow of a conductive fluid and a magnetic circuit disposed to surround the cylindrical chamber such that the presence of a moving conductive fluid creates an electrical current;

an inverter coupled to the electrical generator, the inverter configured as an on/off switch for converting the direct current output into a train of current pulses; and a step-up transformer including
- a primary coil coupled to the electrical generator and the inverter for providing a circuit path for the train of current pulses and
- a secondary coil for converting the train of current pulses into an AC output voltage of a predetermined voltage level, as a function of at least the number of turns forming the secondary coil; and an electrical energy useful load coupled to the secondary coil.

\* \* \* \* \*